US011950619B2

(12) United States Patent
Bosmans

(10) Patent No.: US 11,950,619 B2
(45) Date of Patent: Apr. 9, 2024

(54) ROASTING SYSTEM

(71) Applicant: LA BOMBA SPRL, Hamme-Mille (BE)

(72) Inventor: Koen Bosmans, Nodebais (BE)

(73) Assignee: LA BOMBA SPRL, Hamme-Mille (BE)

( * ) Notice: Subject to any disclaimer, the term of this patent is extended or adjusted under 35 U.S.C. 154(b) by 755 days.

(21) Appl. No.: 17/055,657

(22) PCT Filed: May 14, 2019

(86) PCT No.: PCT/EP2019/062318
§ 371 (c)(1),
(2) Date: Nov. 16, 2020

(87) PCT Pub. No.: WO2019/219666
PCT Pub. Date: Nov. 21, 2019

(65) Prior Publication Data
US 2021/0227872 A1   Jul. 29, 2021

(30) Foreign Application Priority Data

May 17, 2018 (BE) .................................. 20185322

(51) Int. Cl.
*A23N 12/12* (2006.01)
*A23G 1/06* (2006.01)
(52) U.S. Cl.
CPC .............. *A23N 12/125* (2013.01); *A23G 1/06* (2013.01)
(58) Field of Classification Search
CPC .......... A23G 1/06; A23N 12/08; A23N 12/12; A23N 12/125

(Continued)

(56) References Cited

U.S. PATENT DOCUMENTS

2007/0033828 A1* 2/2007 Hartkop ................. A23N 12/08
34/245

FOREIGN PATENT DOCUMENTS

AU    2010224353 A1   4/2011
CN       201878735 U   6/2011
(Continued)

OTHER PUBLICATIONS

Wikipedia: "Materiau a changement de phase (thermique)—Wikipedia" Apr. 11, 2018, Retrieved from the Internet: URL: https://fr.wikipedia.org/wiki/Materiau_a_changement_de_phase_ (thermique).

(Continued)

*Primary Examiner* — Dana Ross
*Assistant Examiner* — James F Sims, III
(74) *Attorney, Agent, or Firm* — KDW Firm PLLC

(57) ABSTRACT

A system for roasting particulate material, such as coffee or cacao beans, grains, malt. The system includes a concentrated solar collector configured for heating a fluid; a heat storage device configured for storing heat of the heated fluid; a particulate material roasting device comprising a treatment compartment configured for receiving the particulate material, and at least one generation unit configured for generating at least one gas and/or steam flow with a controlled temperature, through said treatment compartment. The at least one generation unit is configured for exchanging heat between said at least one gas and/or steam flow and a second flow. A circulation system is configured for generating the second flow by using heat stored in the storage device, and is configured for using directly the heated fluid.

20 Claims, 5 Drawing Sheets

(58) Field of Classification Search
USPC .......................................................... 99/483
See application file for complete search history.

(56) References Cited

FOREIGN PATENT DOCUMENTS

| | | |
|---|---|---|
| CN | 206005888 U | 3/2017 |
| CN | 107388598 A | 11/2017 |
| FR | 1583926 A | 12/1969 |
| FR | 2034067 A5 | 12/1970 |
| FR | 2411577 A1 | 7/1979 |
| FR | 2994798 A1 | 3/2014 |
| WO | 2007021650 A2 | 2/2007 |

OTHER PUBLICATIONS

International Search Report and Written Opinion for the Patent Application No. PCT/EP2019/062318, dated Jul. 16, 2019, 14 pages.

* cited by examiner

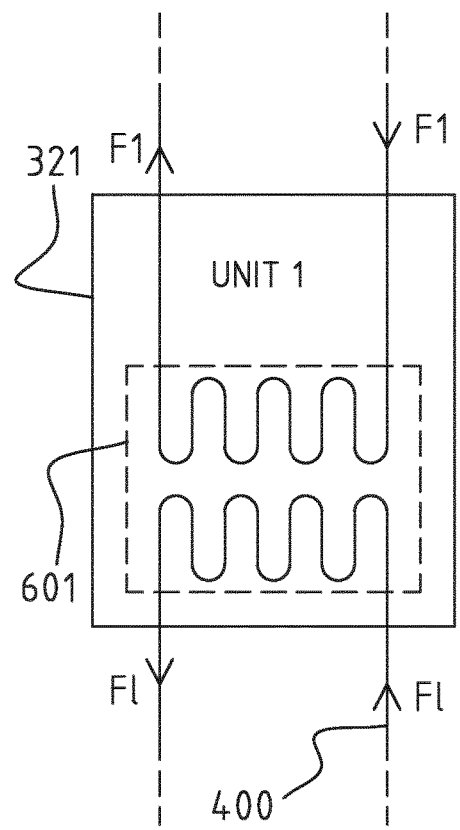
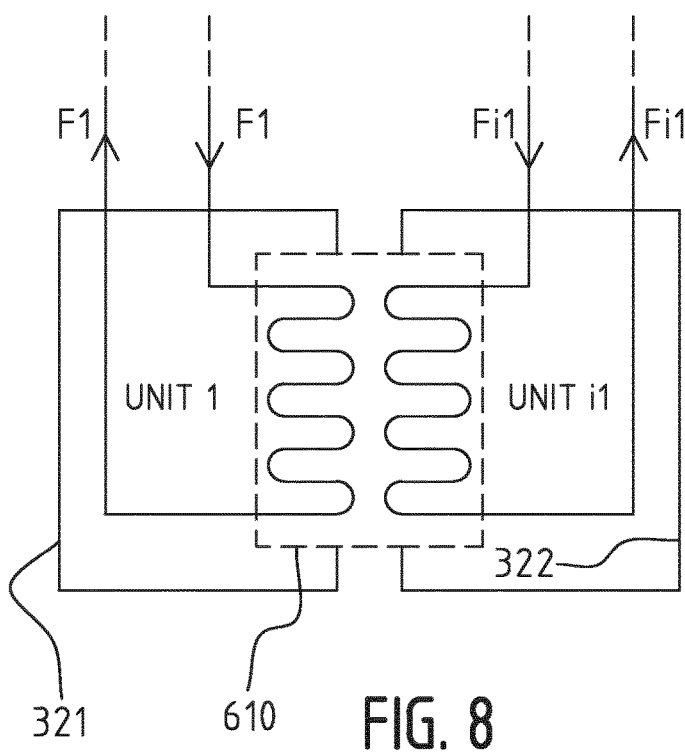
FIG. 7
FIG. 8
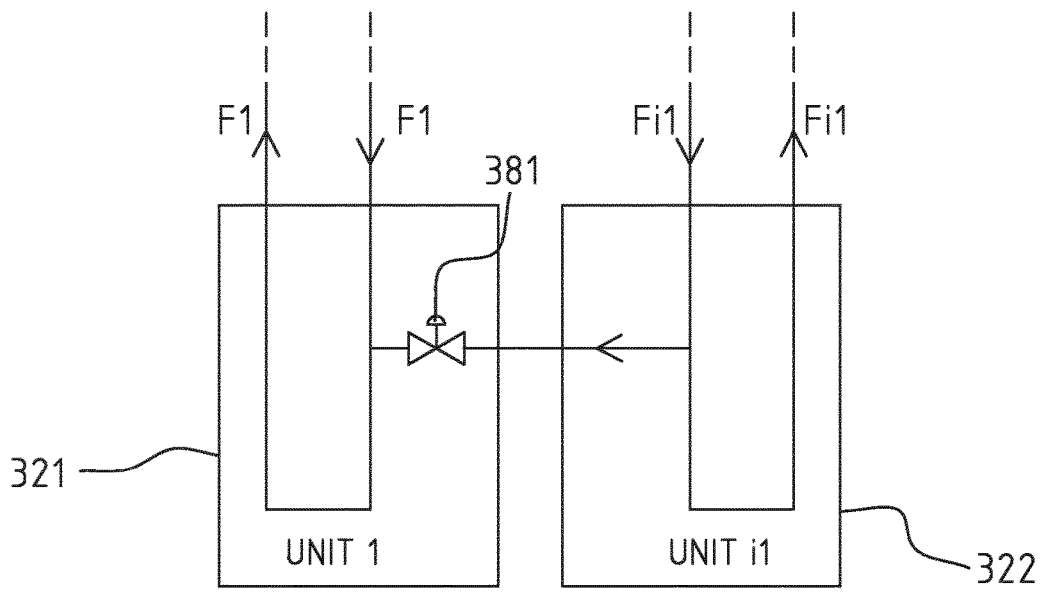
FIG. 9

ROASTING SYSTEM

"This is a national stage application filed under 35 U.S.C. § 371 of pending international application PCT/EP2019/062318, filed May 14, 2019, which claims priority to Belgian Patent Application No. 20185322, filed May 17, 2018, the entirety of which applications are hereby incorporated by reference herein."

FIELD OF THE INVENTION

The present invention concerns a roasting system of particulate material, such as coffee or cacao beans, grains, malt.

BACKGROUND TO THE INVENTION

Although roasting of particulate material, such as cacao or coffee beans, is undertaken in large industrial installations, it remains an extremely delicate operation, requiring a particular expertise. The chemical composition of the material changes during roasting: its appearance, as well as the development of flavours and tastes, evolve during this operation. In addition, some elements disappear on contact with heat, while others combine.

According to known solutions in the industry, roasting takes place in a circular or cylindrical grill, called a roaster. This is a device equipped with a permanently rotating drum so that the material, always moving, is roasted in a uniform way and without being burned. The heat source must be regulated because the reactions evolve during roasting. At the end of the operation, the material must be cooled rapidly to interrupt the chemical processes.

During roasting, the particulate material must reach a uniform temperature within itself, in order to obtain the best possible quality. Some techniques are distinguished by their duration and by the amount of heat used. The traditional method operates at low temperature for a long time, entailing a small production quantity but obtaining the best quality. In contrast, industrial processes that allow faster production speeds are generally performed at higher temperatures, with the result that a portion of the material will be burned, releasing less refined flavours.

At present, energy is not used optimally in roasting devices, and numerous losses can be highlighted, for example with regard to an open system with emissions of gas and/or roasting steam to the outside of the system. In addition, energy consumption can prove to be substantial when it concerns industrial processes operating at high temperature. Emissions treatment installations are not optimally adjusted and operate at high power levels, which can have an impact on the environment.

SUMMARY

The object of the embodiments of the invention is to propose a particulate material roasting system for which the amount of energy required is reduced. More particularly, the embodiments of the invention are intended to propose a particulate material roasting system capable of being implemented industrially and of operating at low temperature in order to obtain roasted material of better quality, with low energy consumption, and at high production rates. To do this, maximum use of renewable energy is considered, avoiding the use of fossil fuel so as to reduce carbon emissions.

According to a first aspect of the invention, a system is proposed for roasting particulate material, such as coffee or cacao beans, grains, malt, said system comprising:

a concentrated solar collector configured for heating a fluid;

a heat storage device configured for storing heat of the heated fluid;

a particulate material roasting device comprising a treatment compartment configured for receiving the particulate material, at least one generation unit configured for generating at least one gas and/or steam flow with a controlled temperature, through said treatment compartment; said at least one generation unit being configured for exchanging heat between said at least one gas and/or steam flow and a second flow;

a circulation system configured for generating the second flow by using heat stored in the storage device, and optionally configured for using directly the heated fluid.

The system is therefore based on a renewable energy source, a heat storage device deriving from this source, and a roasting device fed by the heat produced and/or stored. The circulation system ensures the delivery of a flow of heat to the roasting device, as well as an exchange of heat between this flow and the roasting device.

Taking account of future energy challenges, the development of sustainable energy sources is becoming more and more topical. However, because energy from these is delivered irregularly, their development is closely linked to that of adequate energy storage systems.

The development of efficient and low cost solutions for thermal energy storage therefore appears to be crucial in light of the advent of heat recovery as well as that of renewable energy such as solar energy. An installation based on solar energy allows the generation of energy on demand, and not only when the sun is shining A concentrated solar energy thermal installation converts solar energy into thermal energy and can therefore store thermal energy, which can subsequently be converted into electrical energy if necessary, by means of a turbine.

According to a preferred embodiment, the concentrated solar collector and the heat storage device are configured for operating in a range of temperatures between 150° C. and 350° C., preferably between 200° C. and 300° C.

In this way, a quality of particulate material is obtained comparable to that which is obtained with a traditional roasting method. This range of temperature also allows the reduction of thermal energy consumption while ensuring that quality.

According to a preferred embodiment, the concentrated solar collector comprises at least one parabolic mirror collector.

Indeed, the inventors have discovered that with this solution the ground surface area of the thermal energy production installation is reduced compared to other solutions. Optionally, photovoltaic panels may be used for the generation of electricity feeding the mechanical devices.

According to a preferred embodiment, the heat storage device comprises at least one phase change material.

Indeed, among existing technologies for storing thermal energy, latent heat storage through the use of phase change materials proves to be an attractive solution since it can lead to a reduced storage size. Phase change materials are materials capable of undergoing a phase transition at a constant temperature. Storage and recovery of energy occur during these phase change processes, and the amount of energy corresponds to their latent heat, which is relatively high compared to sensible heat storage systems.

According to an exemplary embodiment, said at least one phase change material comprises an upstream phase change material and a downstream phase change material. Preferably, the melting temperature of the upstream phase change material is higher than the melting temperature of the downstream phase change material. Preferably, the solidification temperature of the upstream phase change material is higher than the solidification temperature of the downstream phase change material.

In this way, if the incident light intensity is low, at least a portion of the heat storage device is in the liquid state and allows the release of useable energy to the roasting device. This configuration involving different phase change materials arranged in layers has higher energy efficiency than a configuration involving only one phase change material.

According to an exemplary embodiment, said at least one phase change material comprises any one or a combination of the following materials: organic material such as paraffin or fatty acids, potassium-acetate or sodium-acetate combination, eutectic mixture of molten salts such as potassium chloride and lithium bromide, metals and their alloys, hydrated salts.

The examples cited above are widely used in scientific and technical literature as reference phase change materials for industrial installations.

According to a preferred embodiment, the heat storage device comprises at least one material capable of storing heat by means of a thermochemical reaction.

Indeed, thermochemical storage is the most common alternative to the use of phase change materials. Indeed, these two techniques have similar storage capacities and costs. Reversible thermochemical reactions, such as adsorption or adhesion of a substance to the surface of a solid or a liquid, can be used for accumulating and restoring heat on demand using different chemical reagents.

According to an exemplary embodiment, said at least one material capable of storing heat by a thermochemical reaction comprises any one or a combination of the following materials: lithium-chloride, zeolites, silica-gels, porous salt hydrates.

The examples cited above are widely used in scientific and technical literature as reference materials capable of storing heat by one or more thermochemical reactions for industrial installations.

According to a preferred embodiment, the heated fluid is composed of steam. According to another preferred embodiment, the heated fluid is composed of thermal oil.

Indeed, steam and thermal oil have attractive calorific capacities for the development of an industrial facility.

According to a preferred embodiment, the circulation system comprises a first collector branch and a second collector branch, a first valve in the first collector branch and a second valve in the second collector branch, and a pump unit configured for pumping the second flow through the first collector branch and the second collector branch. The concentrated solar collector comprises a first collecting unit in the first collector branch and a second collecting unit in the second collector branch.

Thus, the system of valves ensures that a preconfigured fluid temperature is reached at the output of the concentrated solar collector, irrespective of the amount of available solar radiation. Thus, if the intensity of solar radiation decreases, the valves close and the fluid circulates more slowly in the concentrated solar collector. This system allows the use of a single pump.

According to a preferred embodiment, the circulation system comprises a first generation branch and a second generation branch, a first valve in the first generation branch and a second valve in the second generation branch, and a pump unit configured for pumping the second flow through the first generation branch and the second generation branch. Said at least one generation unit comprises a first generation unit coupled to the first generation branch and a second generation unit coupled to the second generation branch, a first heat exchanger in the first generation unit and a second generation heat exchanger in the second generation unit.

Thus, the device of valves allowing regulation of the temperature of the gas and/or steam flow in the generation units allows the use of a single pump. For regulating these temperatures, the valves can open more and more until reaching a certain percentage of the maximum opening capacity. Beyond this value, the pump can start pumping further for regulating said temperatures.

According to an exemplary embodiment, the pump unit comprises a pump and a variable speed drive configured for controlling the speed of the pump.

Thus, the pump unit is configured for using a minimal amount of electrical energy for pumping the second flow through each branch of the circulation system, such that said valves are opened in such a way that the pressure drop is minimised.

According to a preferred embodiment, a generation unit of said at least one generation unit comprises a heat exchanger with a first branch in which a gas and/or steam flow circulates, and a second branch in which the second flow generated by the circulation system circulates. Said heat exchanger allows regulation of the temperature of said gas and/or steam flow.

According to a preferred embodiment, said at least one generation unit comprises a first generation unit, a second generation unit, and a heat exchanger with a first branch in which the gas and/or steam flow generated by the first generation unit circulates, and a second branch in which a gas and/or steam flow generated by the second generation unit circulates. Said heat exchanger allows the recovery of the energy from the gas and/or steam flow generated by the second generation unit and that has passed through the treatment compartment.

In this way, each generation unit can communicate with the circulation system or with another generation unit via heat exchangers, so as to regulate the temperature of the gas and/or steam flow.

According to an exemplary embodiment, the system further comprises a control system configured for controlling said heat exchanger between a generation unit and the circulation system, and/or said heat exchanger between a first generation unit and a second generation unit, in order to regulate the temperature of the gas and/or steam flow generated by said generation unit.

According to an exemplary embodiment, the system further comprises a fan arranged in said first branch, and a valve arranged between said first branch and a fresh air inlet. The control system is configured for controlling the fan and/or the valve.

As described above, the temperature of the gas and/or steam flow of each generation unit is regulated via heat exchangers. The speed and the composition of these flows are respectively regulated by the use of fans and adjustable valves.

According to a preferred embodiment, said at least one generation unit comprises a first generation unit and a second generation unit. The first generation unit is configured for using directly, that is to say without recourse to a heat exchanger, at least a portion of the gas and/or steam flow generated by the second generation unit, preferably of a generation unit downstream of said first generation unit, and which has passed through the treatment compartment, for generating its own gas and/or steam flow.

Thus, not only energy but also material can be transferred from one generation unit to another.

According to an exemplary embodiment, the first generation unit comprises a valve configured for regulating the gas and/or steam flow from the second generation unit to the first generation unit. The system further comprises a control system configured for controlling said valve in order to regulate the temperature and/or the composition of the gas and/or steam flow generated by the first generation unit.

This valve allows the regulation of the portion of the flow coming from the second generation unit that is redirected towards the first generation unit.

According to a preferred embodiment, the roasting device comprises a transport system configured for transporting a layer of particulate material through the treatment compartment comprising a first zone, one or more intermediate zones and a last zone such that the particulate material consecutively passes through the first zone, the intermediate zones, and the last zone.

The existing solution for roasting particulate material is the use of the batch or discontinuous method, wherein particulate material is shaken in a rotating drum while hot air is blown through it. This method produces batches of roasted material at regular intervals. The advantages of transporting a layer of particulate material, allowing continuous operation, through a treatment compartment comprising several zones are the reduction of the amount of mechanical energy to be supplied during the roasting as well as the possibility of working at lower temperatures that can be adjusted so as to achieve an optimal roasting, resulting in higher quality roasted material. Although the method of roasting using a treatment compartment comprising a plurality of zones is the preferred method according to the aim of the embodiments of the present invention, the use of one or more rotary drums combined with a concentrated solar collector and a heat storage device may be considered. As these two methods do not operate in the same range of temperatures, different configurations and operating regimes may be considered for the production and storage of heat.

According to an exemplary embodiment, the transport system comprises feeding means configured for feeding the particulate material such that the layer has a thickness which comprises not more than 10 particles of the particulate material, such as beans, preferably not more than 3 particles, more preferably not more than 2 particles.

In this way, the determination of the maximum height of the layer of particulate material, that is to say of the number of particles that can be superimposed without these particles adhering to each other, ensures a uniform temperature within all the particles. By providing a thin layer, it is easier to make the temperature within the particles more homogeneous.

According to a preferred embodiment, said at least one generation unit comprises: a first generation unit configured for generating a first gas and/or steam flow through the first zone; one or more intermediate generation units configured for generating one or more intermediate gas and/or steam flows through the intermediate zone or zones; a last generation unit configured for generating a last gas and/or steam flow through the last zone; a control system configured for controlling said first generation unit, said intermediate generation unit or units, and said last generation unit, such that the layer of particulate material is preheated and dried in the first zone, roasted in the intermediate zone or zones, and cooled in the last zone.

Thus, this roasting device is divided into different zones, where each zone has a different temperature in order to reach in each zone a certain predetermined temperature within the particulate material, the heating being provided by gas and/or steam.

According to an exemplary embodiment, the control system is configured for using at least a portion of the gas and/or steam flow that has passed through one of the zones for generating the gas and/or steam flow of another zone, preferably of a zone upstream of said zone.

This heat recovery and recirculation system allows the reduction of both the consumption of thermal energy and the level of gas and/or steam emissions to the outside. The use of at least a portion of the gas and/or steam flow that has passed through a zone downstream of the zone that recovers this flow has the advantage that the latter is at a higher temperature. Thus, the amount of heat recovered is greater.

According to a preferred embodiment, the concentrated solar collector, the heat storage device, the particulate material roasting device and the circulation system form a substantially closed system, such that substantially no energy escapes from the substantially closed system.

Thus, designing a closed system allows the reduction of both the consumption of thermal energy and the level of emissions of gas and/or roasting steam to the outside of the system. In this way, the emissions treatment installations can be optimally adjusted and operate at lower power levels, thus allowing excellent performance while respecting the environment.

BRIEF DESCRIPTION OF THE FIGURES

Embodiments of the present invention will be described hereinafter in more detail with reference to the attached drawings. In the drawings, identical reference numerals correspond to identical or similar characteristics.

FIG. 7 illustrates a schematic view of an exemplary embodiment of the interface between the circulation system and a generation unit of the roasting device according to the invention;

FIG. 8 illustrates a schematic view of an exemplary embodiment of the interface between two generation units of the roasting device according to the invention; and FIG. 9 illustrates a schematic view of another exemplary embodiment of the interface between two generation units of the roasting device according to the invention.

DESCRIPTION OF THE EMBODIMENTS

Figure 1:
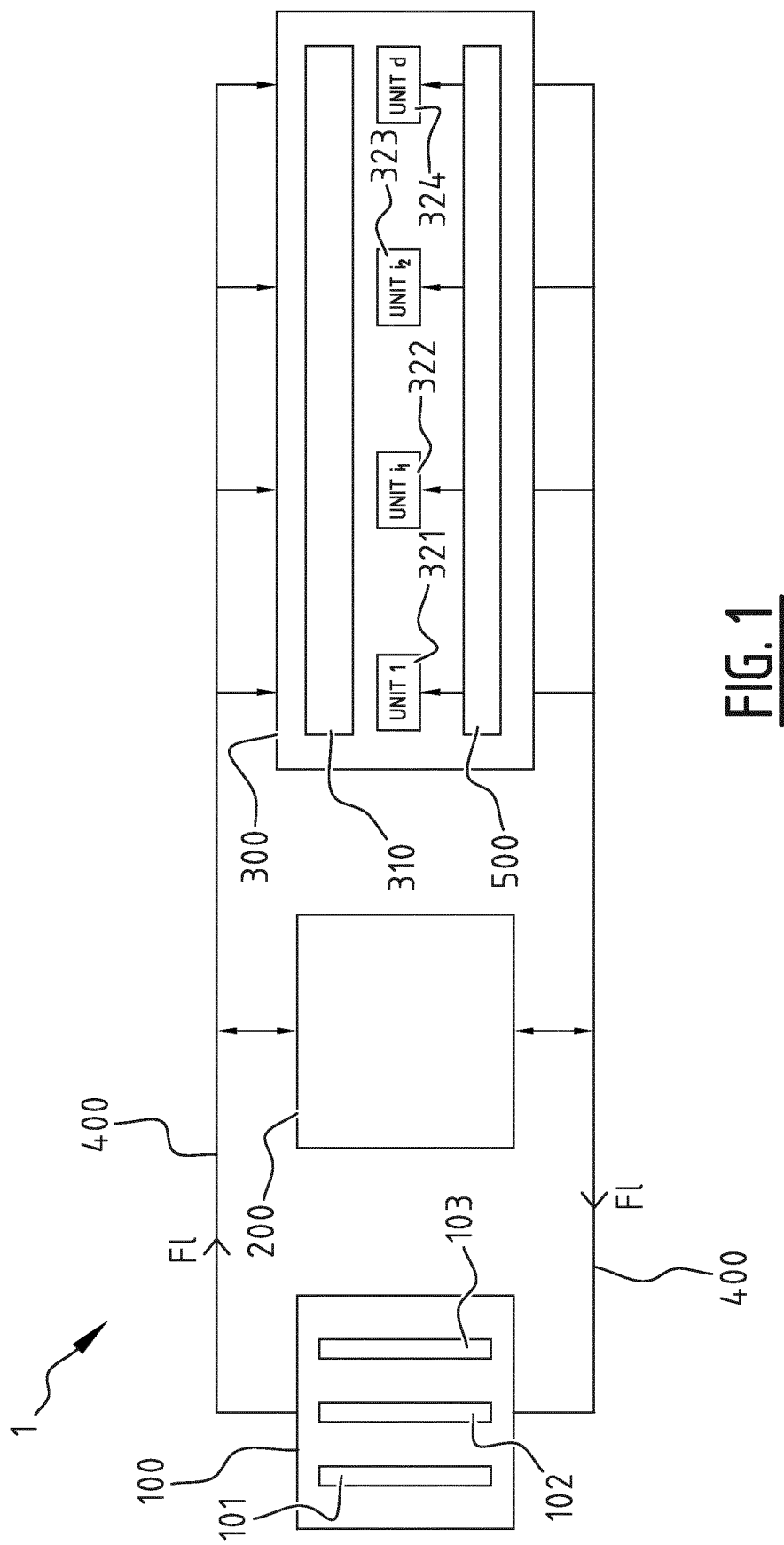
FIG. 1 illustrates a schematic view of an exemplary embodiment of a roasting system according to the invention.

FIG. 1 schematically illustrates an exemplary embodiment of a roasting system according to the present invention.

In the exemplary embodiment illustrated in FIG. 1, the system 1 for roasting particulate material, such as coffee or cacao beans, grains, malt, comprises a concentrated solar collector 100 configured for heating a fluid F1 comprising three collecting units 101, 102, 103, a heat storage device 200 configured for storing the heat of the heated fluid F1, and a roasting device 300 of particulate material P. The latter comprises a treatment compartment 310 configured for receiving the particulate material, as well as four generation units 321, 322, 323, 324 configured for generating four gas and/or steam flows with controlled temperatures, through the treatment compartment 310. One or more generation units, and preferably each generation unit, is or are configured for exchanging heat between the gas and/or steam flow that it generates and a second flow.

The system 1 also comprises a circulation system 400 configured for generating this second flow, using the heat stored in the storage device 200, and optionally configured for using directly the heated fluid F1. This heated fluid F1 may be composed of steam or thermal oil, but the person skilled in the art will understand that another fluid with a similar calorific capacity can be used. Preferably, the concentrated solar collector 100 and the heat storage device 200 are configured for operating in a range of temperatures between 150° C. and 350° C., preferably between 200° C. and 300° C. This range of temperature corresponds to obtaining a quality of particulate material comparable to that which is obtained with a traditional roasting method, while at the same time allowing the reduction of consumption of thermal energy.

The concentrated solar collector 100 comprises three collecting units 101, 102, 103 arranged in parallel, but the person skilled in the art will understand that the number and/or arrangement (in series or in parallel) of the collecting units comprised in the concentrated solar collector 100 may vary. In addition, the collecting units 101, 102, 103 preferably correspond to parabolic mirror collectors, but the person skilled in the art will understand that it can for example be solar thermal towers or Fresnel linear reflectors.

The type of heat storage device 200 is not specified in the exemplary embodiment illustrated in FIG. 1. It may for example be a device based on the use of one or more phase change materials, or a device based on the use of one or more materials capable of storing heat by one or more thermochemical reactions. The first category of materials includes, for example, materials such as paraffin or fatty acids, potassium-acetate or sodium-acetate combination, eutectic mixture of molten salts such as potassium chloride and lithium bromide, metals and their alloys, hydrated salts, or a combination of the aforementioned materials. The second category of materials comprises, for example, materials such as lithium-chloride, zeolites, silica gels, porous salt hydrates, or a combination of the aforementioned materials.

The roasting device 300 comprises four generation units 321, 322, 323, 324, but the person skilled in the art will understand that their number may vary. In addition, the treatment compartment 310 may comprise a transport system 330 configured for transporting a layer L of particulate material P, or else a system of rotating drums. Thus, the roasting of particulate material P may be carried out continuously or discontinuously. Finally, the roasting device 300 comprises a control system 500 configured for regulating the temperature and/or the composition and/or the speed of each gas and/or steam flow generated by each generation unit.

The concentrated solar collector 100, the heat storage device 200, the roasting device 300 of particulate material P and the circulation system 400 form a substantially closed system, such that substantially no energy escapes from the substantially closed system. Thus, it reduces both the consumption of thermal energy and the level of emissions of gas and/or roasting steam to the outside of the system 1.

Figure 2:
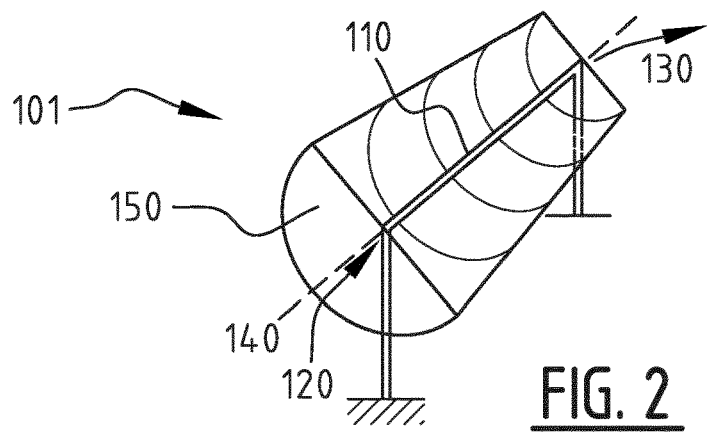
FIG. 2 illustrates a schematic view of an exemplary embodiment of a concentrated solar collector according to the invention.

FIG. 2 schematically illustrates an exemplary embodiment of a concentrated solar collector according to the invention.

In the exemplary embodiment illustrated in FIG. 2, the parabolic mirror collector 101 comprises an inlet 120 and an outlet 130 of fluid F1, as well as a central pipe 110 in which the fluid F1 subjected to solar radiation circulates. The parabolic mirrors 150 can be oriented in the direction of the incident light rays, and are configured for reflecting and focusing these incident rays at the central pipe 110. The inclination of the parabolic mirrors 150 operates with respect to the horizontal axis of rotation 140. Preferably, the infrastructure of the central pipe and the central pipe 110 itself are made of the same material, for example steel covered with a dark coloured layer, thus avoiding different thermal expansions under the effect of solar radiation due to the use of two different materials. Indeed, if the pipe is made for example of glass and the infrastructure, that is to say the supports of the parabolic mirror collector 101, is made for example of steel, these two materials will not expand in the same way under the effect of heat, since they do not have the same thermal characteristics.

Figure 3:
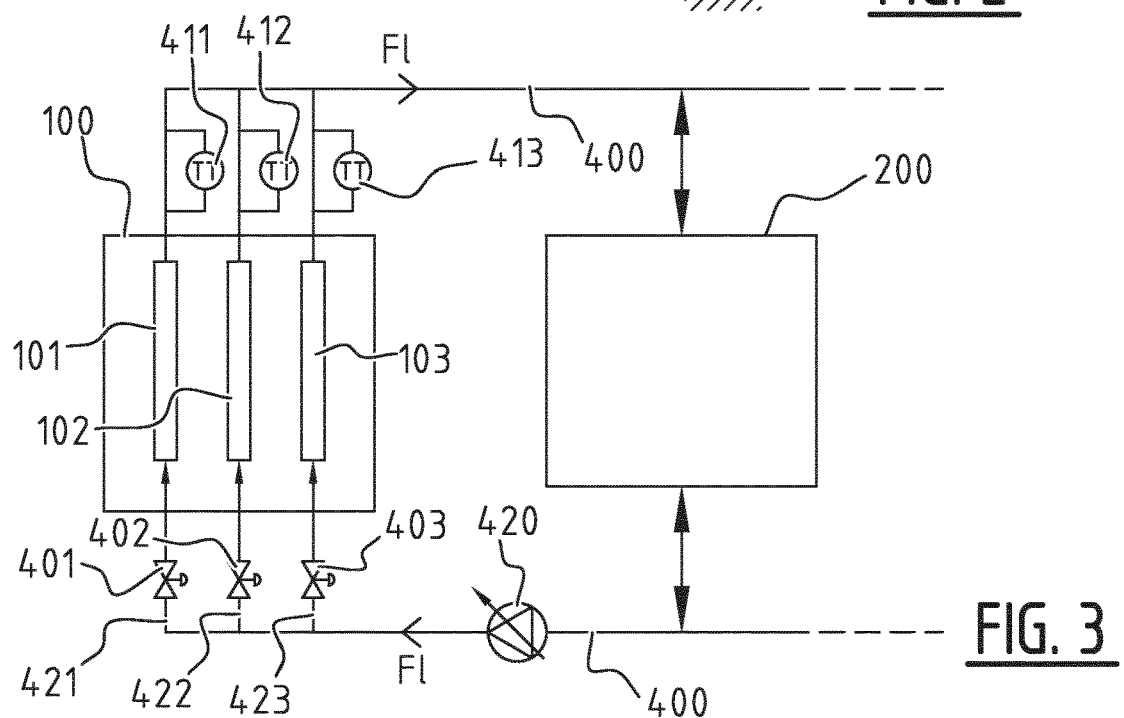
FIG. 3 illustrates a schematic view of an exemplary embodiment of the interface between the concentrated solar collector and the heat storage device according to the invention.

FIG. 3 schematically illustrates an exemplary embodiment of the interface between the concentrated solar collector and the heat storage device according to the invention.

In the exemplary embodiment illustrated in FIG. 3, the concentrated solar collector 100 and the heat storage device 200 communicate through the circulation system 400. The latter comprises three collector branches 421, 422, 423, three valves 401, 402, 403, one in each of the three collector branches, and a pump unit 420 configured for pumping the fluid F1 through the three collector branches 421, 422, 423. The pump unit 420 thus delivers the fluid F1 to three collecting units 101, 102, 103 arranged in parallel. Upstream of these collecting units are the three adjustable valves 401, 402, 403. Downstream of these collecting units is a system of three temperature sensors 411, 412, 413.

Figure 4:
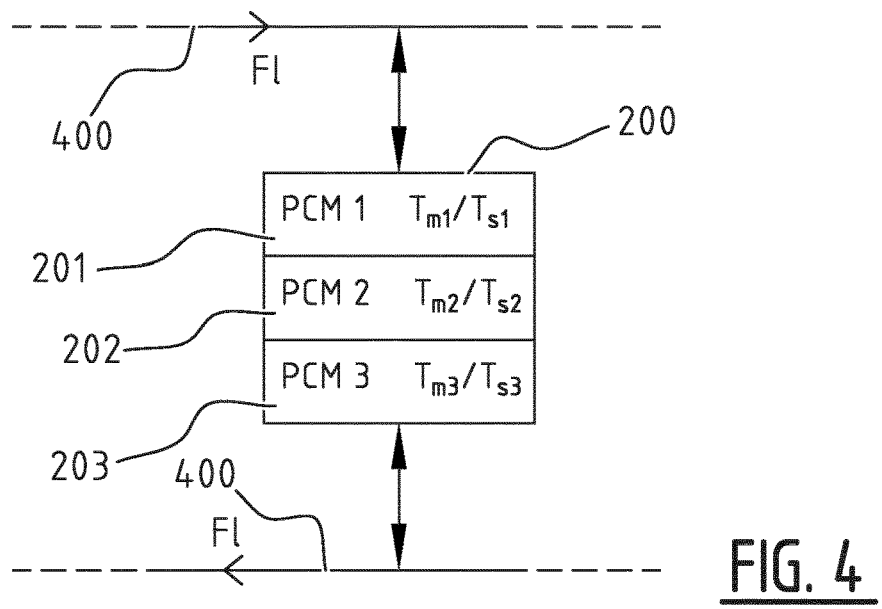
FIG. 4 illustrates a schematic view of an exemplary embodiment of a heat storage device according to the invention.

The system of valves 401, 402, 403 ensures that a preconfigured temperature of the fluid F1 is achieved at the outlet 130 of the solar concentrator 100, regardless of the amount of available solar radiation. Thus, if the intensity of the solar radiation decreases, the valves 401, 402, 403 close and the fluid F1 circulates more slowly in the collector 100. This system allows the use of a single pump unit 420. In addition, the pump unit 420 may comprise a pump and a variable speed drive configured for controlling the speed of the pump. Thus, the pump unit 420 is configured for using a reduced amount of electrical energy for pumping the fluid F1 through the three collector branches 421, 422, 423 of the circulation system 400, so that the valves 401, 402, 403 are opened in such a way that the pressure drop is minimised FIG. 4 schematically illustrates an exemplary embodiment of a heat storage device according to the invention.

In the exemplary embodiment illustrated in FIG. 4, the fluid F1 heated by the concentrated solar collector 100 enters the heat storage device 200, with the aim of being stored there and retrieved later. The device 200 comprises three distinct layers 201, 202, 203 corresponding to three different phase change materials PCM1, PCM2, PCM3, having different melting temperatures Tm1, Tm2, Tm3. The person skilled in the art will understand that their number may vary, and that some materials may be identical. Preferably, the melting temperature of an upstream phase change material is higher than the melting temperature of a downstream phase change material. Also preferably, the solidification temperature of an upstream phase change material is higher than the solidification temperature of a downstream phase change material. For example, the melting temperature Tm1 can be between 350° C. and 250° C., and the melting temperature Tm3 can be between 250° C. and 150° C. These ranges of temperature are compatible with the ranges of temperature of the traditional roasting method. Thus, if the incident light intensity is low, at least a portion of the heat storage device 200 is in the liquid state and allows the release of usable energy to the roasting device 300. This configuration involving different phase change materials arranged in layers has higher energy efficiency than a configuration involving only one phase change material. However, the addition of heat conducting materials such as graphite or metals within the phase change material or materials allows the increase of the thermal conductivity of this or these latter. Modelling calculations should also take into account possible overlaps in the values of the melting temperatures Tm1, Tm2, Tm3 and of the solidification temperatures Ts1, Ts2, Ts3 of the phase change materials PCM1, PCM2, PCM3.

Figure 5:
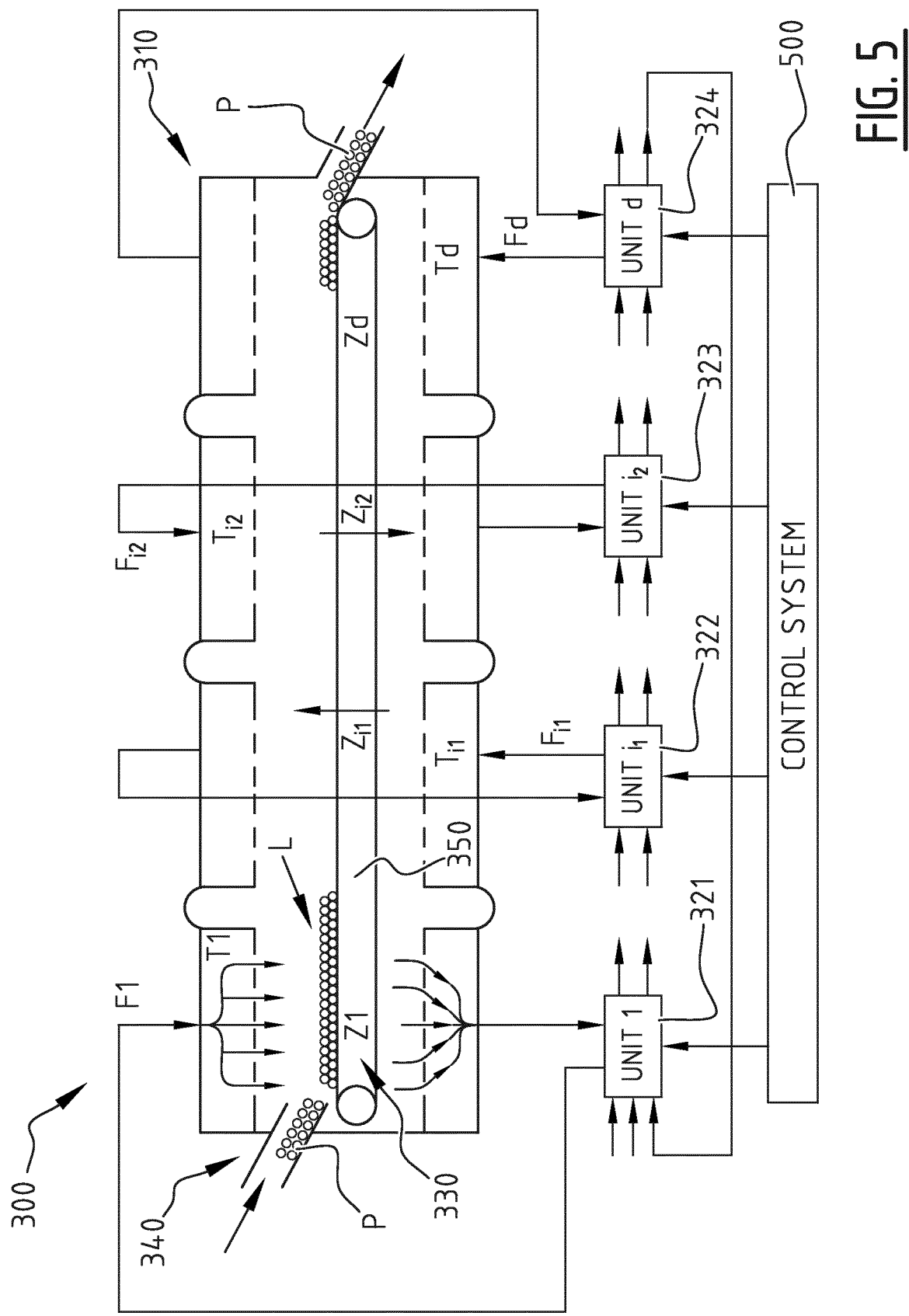
FIG. 5 illustrates a schematic view of an exemplary embodiment of a continuous roasting device of particulate material according to the invention.

FIG. 5 schematically illustrates an exemplary embodiment of a continuous roasting device of particulate material according to the invention.

In the exemplary embodiment illustrated in FIG. 5, the continuous roasting device 300 comprises a treatment compartment 310, a transport system 330, a first fluid generation unit 321, two intermediate fluid generation units 322, 323, a last fluid generation unit 324, and a control system 500. The treatment compartment 310 is composed of a first zone Z1, two intermediate zones Zi1, Zi2, and a last zone Zd. The transport system 330 is configured for transporting a layer L of particulate material P through the treatment compartment 310, so that the particulate material P passes consecutively through the first zone Z1, the two intermediate zones Zi1, Zi2, and the last zone Zd. The person skilled in the art will understand that the number and length of each zone may vary. Thus, each zone may have its own length, and the treatment compartment 310 may comprise more than two intermediate zones.

The transport system 330 comprises feeding means 340 configured for feeding the particulate material P, without introducing air from the environment, so that the layer L has a thickness that comprises not more than 10 particles of particulate material, such as coffee or cacao beans, grains, malt, or a thickness that is smaller than 100 mm, preferably not more than 3 particles, or a thickness that is smaller than 20 mm, and more preferably not more than 2 particles, or a thickness that is smaller than 15 mm. In addition, the transport system 330 comprises a conveyor belt 350 with a substantially flat surface that supports the layer L of particulate material P. The conveyor belt 350 passes through the first zone Z1, the two intermediate zones Zi1, Zi2, and the last zone Zd. The mechanical energy required for the movement of the conveyor belt 350 can be provided by electricity generated by a plurality of photovoltaic panels. These latter, coupled to parabolic mirror collectors for the generation of thermal energy, meet the demand for minimising the ground surface area of the energy production installation according to the aim of the invention.

The first fluid generation unit 321 is configured for generating a first gas and/or steam flow F1 through the first zone Z1, the two intermediate fluid generation units 322, 323 are configured for generating two intermediate gas and/or steam flows Fi1, Fi2 through the intermediate zones Zi1, Zi2, and the last fluid generation unit 324 is configured for generating a last gas and/or steam flow Fd through the last zone Zd. The conveyor belt 350 is configured for allowing the first gas and/or steam flow F1, the two intermediate gas and/or steam flows Fi1, Fi2 and the last gas and/or steam flow Fd to pass through the layer L of particulate material P that it supports. For example, the conveyor belt 350 may comprise apertures in the same way as a perforated belt, or may be made of porous material, thus allowing the flow of gas and/or steam to pass through. The control system 500 is configured for using at least a portion of the gas and/or steam flow that has passed through one of the zones Z1, Zi1, Zi2, Zd for generating the gas and/or steam flow of another zone Z1, Zi1, Zi2, Zd, preferably from another zone upstream of said zone.

The control system 500 is configured for controlling the temperature T1 and/or the composition and/or the speed of the first gas and/or steam flow F1, the two intermediate gas and/or steam flows Fi1, Fi2, and the last gas and/or steam flow Fd. The temperature T1 is controlled to be between 45° C. and 150° C., the temperatures Ti1, Ti2 are controlled to be between 150° C. and 350° C., and the temperature Td is controlled to be between 10° C. and 100° C. The relative humidity of the two intermediate gas and/or steam flows Fi1, Fi2 is also controlled. Typically, the temperature Ti1 of the first intermediate zone Zi1 is higher than the temperature T1 of the first zone Z1, and the temperature of an intermediate zone downstream of a given intermediate zone is higher than that of said zone. Furthermore, typically the temperature Td of the last zone Zd is lower than the temperature T1 of the first zone Z1.

Figure 6:
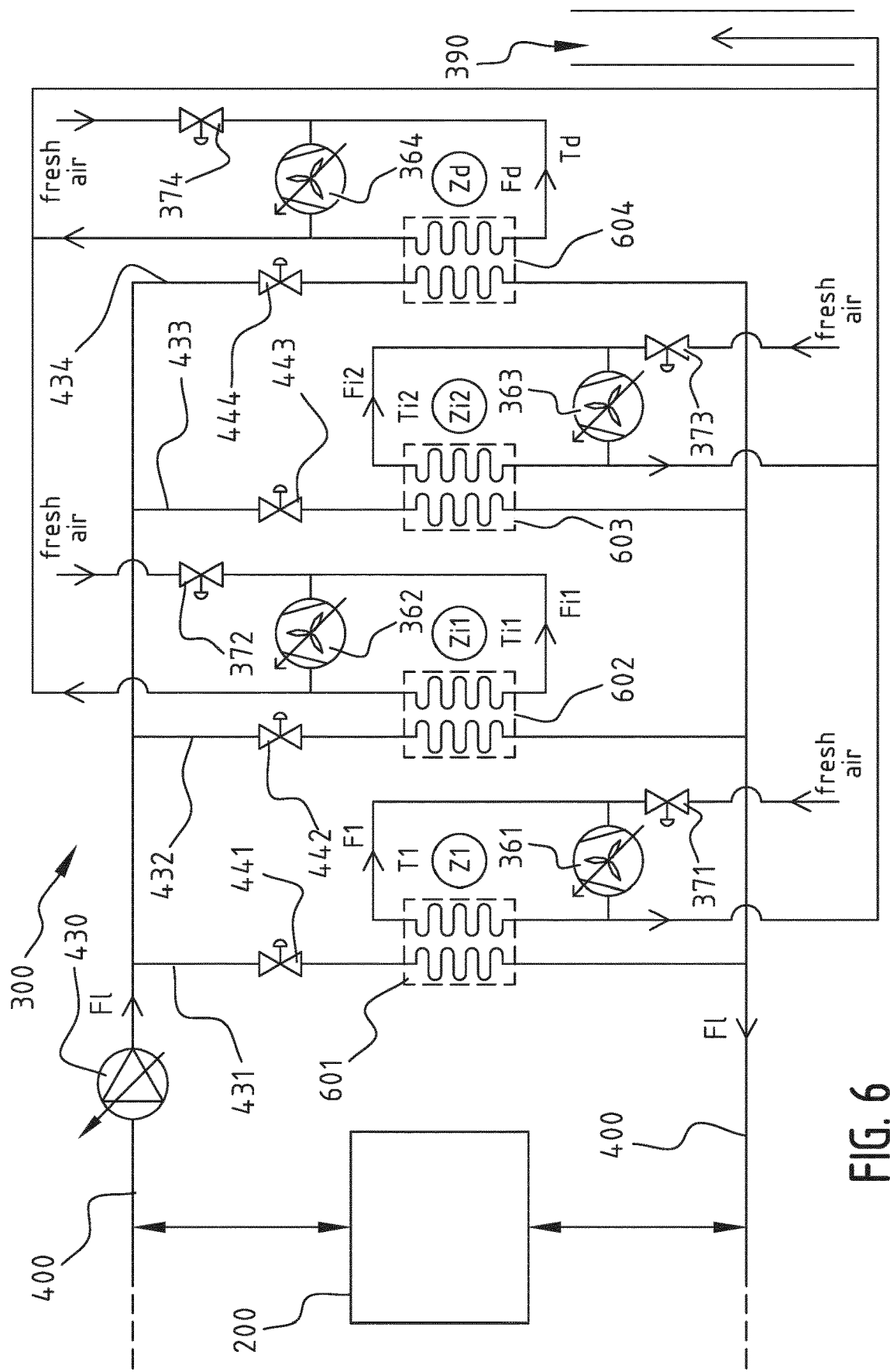
FIG. 6 illustrates a schematic view of an exemplary embodiment of the interface between the heat storage device and the roasting device according to the invention.

FIG. 6 schematically illustrates an exemplary embodiment of the interface between the heat storage device and the roasting device according to the invention.

In the exemplary embodiment illustrated in FIG. 6, the heat storage device 200 and the roasting device 300 (not shown in its entirety for the sake of clarity) communicate through the circulation system 400. The latter comprises four generation branches 431, 432, 433, 434, four valves 441, 442, 443, 444, one in each of the four generation branches, and a pump unit 430 configured for pumping the fluid F1 through the four generation branches 431, 432, 433, 434. The pump unit 430 thus delivers the fluid F1 to the treatment compartment 310 (not shown for the sake of clarity). The latter comprises a first zone Z1, through which a gas and/or steam flow F1 circulates at a temperature T1, two intermediate zones Zi1, Zi2 through which the gas and/or steam flows Fi1, Fi2 circulate respectively at temperatures Ti1, Ti2, and a last zone Zd through which a gas and/or steam flow Fd circulates at a temperature Td. The person skilled in the art will understand that the number of intermediate zones may vary.

Upstream of the treatment compartment 310 are the four valves 441, 442, 443, 444. The person skilled in the art will understand that these four valves 441, 442, 443, 444 may also be downstream of the treatment compartment 310. This device of cascading valves allowing regulation of the temperature of the gas and/or steam flow in each zone Z1, Zi1, Zi2, Zd allows the use of only one pump unit 430. In addition, the pump unit 430 may comprise a pump and a variable speed drive configured for controlling the speed of the pump. Thus, the pump unit 430 is configured for using a reduced amount of electrical power for pumping the fluid F1 through the four generation branches 431, 432, 433, 434 of the circulation system 400, so that the valves 441, 442, 443, 444 are opened in such a way that the pressure drop is minimised To regulate these temperatures, the valves 441, 442, 443, 444 can open more and more until reaching for example about 95 percent of the maximum opening capacity. Beyond this value, the pump unit 430 may begin to pump further to regulate said temperatures.

The circulation system 400 can exchange heat with each of the four zones Z1, Zi1, Zi2, Zd comprised in the treatment compartment 310, by means of heat exchangers 601, 602, 603, 604.

Indeed, each of the four generation units (not shown for the sake of clarity), corresponding to each of the four zones Z1, Zi1, Zi2, Zd, is respectively coupled to a branch 431, 432, 433, 434 of the circulation system 400. Each of the four generation units, in which the gas and/or steam flows F1, Fi1, Fi2, Fd circulate, comprises an adjustable fan 361, 362, 363, 364 allowing the regulation of the speed of said gas and/or steam flows thanks to for example a variable speed drive, as well as an adjustable valve 371, 372, 373, 374 allowing regulation of the level of humidity present in the flows F1, Fi1, Fi2, Fd thanks to a fresh air circuit outside of the roasting device 300. Finally, a funnel 390 makes it possible to avoid the four generation units overreacting because of the presence of fresh air intake circuits alongside the fans 361, 362, 363, 364 and the valves 371, 372, 373, 374.

FIG. 7 schematically illustrates an exemplary embodiment of the interface between the circulation system and a generation unit of the roasting device according to the invention.

In the exemplary embodiment illustrated in FIG. 7, the first generation unit 321, in which the gas and/or steam flow F1 circulates, communicates with the circulation system 400, in which the fluid F1 circulates, through the heat exchanger 601. The latter therefore has a first branch in which the gas and/or steam flow F1 circulates, and a second branch in which the fluid F1 generated by the circulation system 400 circulates. The heat exchanger 601 allows the regulation of the temperature T1 of the flow F1. FIG. 7 zooms in therefore on the heat exchanger associated with zone Z1 which is shown in FIG. 6. The person skilled in the art understands that the description above can also be applied to one or more other generation units, associated with the other zones Zi1, Zi2, Zd shown in FIG. 6. In addition, the control system (not shown) is configured for controlling the heat exchanger 601 in order to regulate the temperature and/or the composition and/or the speed of the gas and/or steam flow F1 generated by the first generation unit 321.

FIG. 8 schematically illustrates an exemplary embodiment of the interface between two generation units of the roasting device according to the invention.

In the exemplary embodiment illustrated in FIG. 8, the first generation unit 321, in which the gas and/or steam flow F1 circulates, communicates with the first intermediate generation unit 322, in which the gas and/or steam flow Fi1 circulates, through the heat exchanger 610. The latter thus has a first branch in which the gas and/or steam flow F1 generated by the first generation unit 321 circulates, and a second branch in which the gas and/or steam flow Fi1 generated by the first intermediate generation unit 322 circulates. The heat exchanger 610 allows the regulation of the temperature T1 and/or the temperature Ti1 of the flow F1 and/or of the flow Fi1. The person skilled in the art will understand that such a heat exchanger can serve as an intermediate between generation units other than units 321 and 322, and not necessarily between two adjacent generation units. For example, it can be envisaged that a heat exchanger is located between units 321 and 323 as shown in FIGS. 1 and 5. In addition, the control system (not shown) is configured for controlling the heat exchanger 610 to regulate the temperature and/or the composition and/or the speed of the gas and/or steam flow F1 generated by the first generation unit 321.

FIG. 9 schematically illustrates another exemplary embodiment of the interface between two generation units of the roasting device according to the invention.

In the exemplary embodiment illustrated in FIG. 9, the first generation unit 321, in which the gas and/or steam flow F1 circulates, communicates directly with the first intermediate generation unit 322, in which the gas and/or steam flow Fi1 circulates, that is to say without the use of a heat exchanger. Thus, each of the two generation units 321, 322 is configured for using directly at least a portion of the gas and/or steam flow generated by the other generation unit 321 or 322, which has passed through the treatment compartment 310, for generating its own gas and/or steam flow F1 or Fi1. Preferably, the generation unit used to withdraw at least a portion of the gas and/or steam flow to the other generation unit is situated downstream of this other unit. In the case shown in FIG. 9, at least a portion of the flow Fi1, of which the temperature Ti1 is higher than the temperature T1 of the flow F1, is drawn off to generate the flow F1 of the generation unit 321. Thus, not only energy but also material can be transferred from one generation unit to another. This characteristic distinguishes the exemplary embodiment illustrated in FIG. 9 from that illustrated in FIG. 8. The person skilled in the art will understand that such an exchange of heat and material can be performed between generation units other than units 321 and 322, and not necessarily between two adjacent generation units. For example, it can be envisaged that an exchange of heat and material takes place between units 321 and 323, preferably from unit 323 to unit 321, as shown in FIGS. 1 and 5. In addition, the generation unit 321 comprises a valve 381 configured for regulating the gas and/or steam flow of the generation unit 322 to the generation unit 321. The control system (not shown) is configured for controlling the valve 381 in order to regulate the temperature and/or the composition and/or the speed of the gas and/or steam flow F1 generated by the generation unit 321. Whilst the principles of the invention have been set out above in connection with specific embodiments, it is to be understood that this description is merely made by way of example and not as a limitation of the scope of protection which is determined by the appended claims.

The invention claimed is:

1. A system for roasting particulate material, such as coffee or cacao beans, grains, malt, said system comprising:
 a concentrated solar collector configured for heating a fluid;
 a heat storage device configured for storing heat of the heated fluid;
 a roasting device for the particulate material comprising a treatment compartment configured for receiving the particulate material, at least one generation unit configured for generating at least one gas and/or steam flow with a controlled temperature, through the treatment compartment; said at least one generation unit being configured for exchanging heat between said at least one gas and/or steam flow and a second flow; and a circulation system configured for generating the second flow by using heat stored in the heat storage device.

2. The system according to claim 1, wherein the concentrated solar collector and the heat storage device are configured for operating in a range of temperatures between 150° C. and 350° C.

3. The system according to claim 1, wherein the concentrated solar collector comprises at least one parabolic-mirror collector.

4. The system according to claim 1, wherein the heat storage device comprises at least one phase change material.

5. The system according to claim 4, wherein the at least one phase change material comprises an upstream phase change material and a downstream phase change material; and wherein the melting temperature of the upstream phase change material is higher than the melting temperature of the downstream phase change material; and/or wherein the solidification temperature of the upstream phase change material is higher than the solidification temperature of the downstream phase change material.

6. The system according to claim 4, wherein the at least one phase change material comprises any one or more of the following materials: organic material, potassium-acetate or sodium-acetate combination, eutectic mixture of molten salts, metals and their alloys, hydrated salts, or a combination thereof.

7. The system according to claim 1, wherein the heat storage device comprises at least one material capable of storing heat by means of a thermochemical reaction.

8. The system according to claim 7, wherein the at least one material capable of storing heat by means of a thermochemical reaction comprises any one or more of the following materials: lithium-chloride, zeolites, silica-gels, porous salt hydrates, or a combination thereof.

9. The system according to claim 1, wherein the heated fluid (F1) is composed of steam.

10. The system according to claim 1, wherein the heated fluid (F1) is composed of thermal oil.

11. The system according to claim 1, wherein the circulation system comprises a first collector branch and a second collector branch, a first valve in the first collector branch and a second valve in the second collector branch, and a pump unit configured for pumping the second flow through the first and second collector branches; wherein the concentrated solar collector comprises a first collecting unit in the first collector branch and a second collecting unit in the second collector branch; and wherein the pump unit comprises a pump and a variable speed drive configured for controlling the speed of the pump.

12. The system according to claim 1, wherein the circulation system comprises a first generation branch and a second generation branch, a first valve in the first generation branch and a second valve in the second generation branch, and a pump unit configured for pumping the second flow through the first generation branch and the second generation branch; wherein the at least one generation unit comprises a first generation unit coupled with the first generation branch and a second generation unit coupled with the second generation branch, a first heat exchanger in the first generation unit and a second heat exchanger in the second generation unit; and wherein the pump unit comprises a pump and a variable speed drive configured for controlling the speed of the pump.

13. The system according to claim 1, wherein a generation unit of said at least one generation unit comprises a heat exchanger having a first branch wherein a gas and/or steam flow circulates, and a second branch wherein the second flow generated by the circulation system circulates, said heat exchanger enabling the regulation of the temperature of said gas and/or steam flow; and/or wherein the at least one generation unit comprises a first generation unit, a second generation unit, and a heat exchanger having a first branch in which the gas and/or steam flow generated by the first generation unit circulates, and a second branch in which a gas and/or steam flow generated by the second generation unit circulates, said heat exchanger enabling the recovery of the energy from the gas and/or steam flow generated by the second generation unit and that has passed through the treatment compartment.

14. The system according to claim 13, further comprising a control system configured for controlling said heat exchanger in order to regulate the temperature of the gas and/or steam flow (F1) generated by said generation unit; the system further comprising a fan arranged in said first branch, and a valve connected between said first branch and a fresh air intake; wherein the control system is configured for controlling the fan and/or the valve.

15. The system according to claim 1, wherein the at least one generation unit comprises a first generation unit and a second generation unit; and wherein the first generation unit is configured to directly use at least a portion of the gas and/or steam flow generated by the second generation unit, and that has passed through the treatment compartment, for generating its own gas and/or steam flow.

16. The system according to claim 15, wherein the first generation unit comprises a valve configured for regulating the gas and/or steam flow from the second generation unit to the first generation unit; and further comprising a control system configured for controlling said valve to regulate the temperature and/or the composition of the gas and/or steam flow (F1) generated by the first generation unit.

17. The system according to claim 1, wherein the roasting device comprises a transport system configured for transporting a layer (L) of particulate material (P) through the treatment compartment comprising a first zone (Z1), one or more intermediate zones (Zi1, Zi2, etc.) and a last zone (Zd) such that the particulate material consecutively passes through the first zone, the one or more intermediate zones, and the last zone; and wherein the transport system comprises feeding means configured for feeding the particulate material (P) such that the layer has a thickness which comprises not more than 5 particles of the particulate material (P).

18. The system according to claim 1, wherein said at least one generation unit comprises: a first generation unit configured for generating a first gas and/or steam flow (F1) through the first zone (Z1); one or more intermediate generation units configured for generating one or more intermediate gas and/or steam flows (Fi1, Fi2, etc.) through the one or more intermediate zones (Zi1, Zi2, etc.); a last generation unit configured for generating a last gas and/or steam flow (Fd) through the last zone (Zd); a control system configured for controlling said first generation unit, said one or more intermediate generation units, and said last generation unit, such that the layer of particulate material is preheated and dried in the first zone, roasted in the one or more intermediate zones, and cooled in the last zone; wherein the control system is configured for using at least a portion of the gas and/or steam flow that has passed through one of the zones (Z1, Zi1, Zi2, etc., Zd) for generating the gas and/or steam flow of another zone (Z1, Zi1, Zi2, etc., Zd).

19. The system according to claim 1, wherein the concentrated solar collector, the heat storage device, the roasting device, and the circulation system form a closed system, such that no energy escapes from the substantially closed system.

20. The system according to claim 1, wherein the circulation system is further configured for generating the second flow by directly using the heated fluid from the concentrated solar collector, without using the heat stored in the heat storage device.

* * * * *